United States Patent
Grim, III et al.

(10) Patent No.: US 9,830,719 B2
(45) Date of Patent: Nov. 28, 2017

(54) RENDERING A THREE-DIMENSIONAL TIME HELIX IN A VIRTUAL UNIVERSE

(75) Inventors: Clifton E. Grim, III, Seabrook, TX (US); Rex E. Marzke, Houston, TX (US); Mark B. Stevens, Austin, TX (US); Gary A. Ward, Seabrook, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/393,436

(22) Filed: Feb. 26, 2009

(65) Prior Publication Data

US 2010/0214285 A1 Aug. 26, 2010

(51) Int. Cl.
| | |
|---|---|
| *G06T 19/00* | (2011.01) |
| *G06F 3/0481* | (2013.01) |
| *G06F 9/44* | (2006.01) |
| *G06T 11/20* | (2006.01) |
| *G06Q 10/00* | (2012.01) |

(52) U.S. Cl.
CPC ........ *G06T 11/206* (2013.01); *G06F 3/04815* (2013.01); *G06Q 10/00* (2013.01)

(58) Field of Classification Search
CPC ... G06T 19/00; G06F 3/0481; G06F 3/04815; G06F 8/34
USPC .......................... 345/419, 661; 715/848, 763
See application file for complete search history.

(56) References Cited

U.S. PATENT DOCUMENTS

| | | | |
|---|---|---|---|
| 5,295,243 A | | 3/1994 | Robertson et al. |
| 6,502,107 B1 * | | 12/2002 | Nishida |
| 6,922,815 B2 | | 7/2005 | Rosen |
| 6,938,218 B1 | | 8/2005 | Rosen |
| 6,987,512 B2 | | 1/2006 | Robertson et al. |
| 7,069,518 B2 | | 6/2006 | Card et al. |
| 7,103,499 B2 | | 9/2006 | Goodwin et al. |
| 7,137,075 B2 | | 11/2006 | Hoshino et al. |
| 7,139,982 B2 | | 11/2006 | Card et al. |
| 7,170,510 B2 | | 1/2007 | Kawahara et al. |
| 7,240,291 B2 | | 7/2007 | Card et al. |
| 7,581,195 B2 * | | 8/2009 | Sciammarella et al. ...... 715/838 |
| 2005/0044509 A1 * | | 2/2005 | Hunleth et al. ............... 715/834 |
| 2005/0060667 A1 * | | 3/2005 | Robbins ........................ 715/848 |
| 2006/0036960 A1 * | | 2/2006 | Loui ................. G06F 17/30274 715/764 |
| 2007/0168879 A1 | | 7/2007 | Reville et al. |
| 2007/0260994 A1 | | 11/2007 | Sciammarella et al. |

(Continued)

OTHER PUBLICATIONS

Hicks, Martin, A Helix Metaphor for Custer Behaviour Visualisation, 2001, Information Visulation, Fifth International Conference, BT Exact Technol. pp. 22-28.*

*Primary Examiner* — Zhengxi Liu
*Assistant Examiner* — Yi Yang
(74) *Attorney, Agent, or Firm* — William H. Hartwell; Madeline F. Schiesser; Keohane & D'Alessandro, PLLC (57) ABSTRACT

The present invention provides a 3-D time helix renderable in a virtual universe. In one embodiment, there is a time helix tool, including a construction component configured to: generate a 3-D time helix in a virtual universe, and populate the 3-D time helix with a set of data objects. The time helix tool further comprises a rendering component configured to render the 3-D time helix with at least one of the set of data objects to a user of the virtual universe.

22 Claims, 7 Drawing Sheets

(56) References Cited

U.S. PATENT DOCUMENTS

2010/0214285 A1* 8/2010 Grim et al. .................. 345/419
2011/0047466 A1* 2/2011 Michelman .................. 715/734

* cited by examiner

RENDERING A THREE-DIMENSIONAL TIME HELIX IN A VIRTUAL UNIVERSE

FIELD OF THE INVENTION

This invention relates generally to virtual universes and more specifically to the organization of data objects rendered in a virtual universe.

CROSS REFERENCE TO COPENDING APPLICATION

Commonly owned U.S. patent application Ser. No. 11/968,772, entitled "Method and Apparatus for Digital Life Recording and Playback" filed on Jan. 3, 2008, contains subject matter related, in certain aspects, to the subject matter of the present application.

BACKGROUND OF THE INVENTION

As systems become more popular that record both the audio and video events of daily life, the ability to find information is becoming increasingly difficult. Even with capabilities as photo image face recognition and scene detection, the systems and interfaces available are limited in their ability to view large amounts of data, as well as the connections among the data elements.

Current prior art systems/user interfaces are generally limited to the two-dimensions of computer screens, with various shading/sizing methods to represent a third dimension. However, virtual universes allow users to navigate completely in three dimensions, thus providing a more natural way to search through data and information. Virtual universes allow avatars to "fly" around in three dimensions, while also allowing information from the real world to be dynamically integrated into the environment. However, virtual universes are still somewhat limited in their ability to efficiently organize and display various audio/video data associated with a user of the virtual universe and/or the user's avatar.

SUMMARY OF THE INVENTION

In one embodiment, there is a method for rendering a three-dimensional (3-D) time helix in a virtual universe. In this embodiment, the method comprises: generating a 3-D time helix in a virtual universe; populating the 3-D time helix with a set of data objects; and rendering the 3-D time helix with at least one of the set of data objects to a user of the virtual universe.

In a second embodiment, there is a computer system for rendering a three-dimensional (3-D) time helix in a virtual universe, the system comprising at least one processing unit and memory operably associated with the at least one processing unit. A time helix tool is storable in memory and executable by the at least one processing unit. The time helix tool comprises a construction component configured to generate a 3-D time helix in a virtual universe, and populate the 3-D time helix with a set of data objects. The time helix tool further comprises a rendering component configured to render the 3-D time helix with at least one of the set of data objects to a user of the virtual universe.

In a third embodiment, there is a computer-readable medium storing computer instructions, which when executed, enables a computer system to render a three-dimensional (3-D) time helix in a virtual universe. In this embodiment, the computer instructions comprise: generating a 3-D time helix in a virtual universe; populating the 3-D time helix with a set of data objects; and rendering the 3-D time helix with at least one of the set of data objects to a user of the virtual universe.

In a fourth embodiment, there is a method for deploying a time helix tool for use in a computer system that allows rendering of a three-dimensional (3-D) time helix in a virtual universe. In this embodiment, a computer infrastructure is provided and is operable to: generate a 3-D time helix in a virtual universe; populate the 3-D time helix with a set of data objects; and render the 3-D time helix with at least one of the set of data objects to a user of the virtual universe.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to rendering a 3-D time helix in a virtual universe to allow users to search, explore, and selectively render data objects within the virtual universe. In these embodiments, a time helix tool provides the capability. Specifically, the time helix tool comprises a creation component configured to generate a 3-D time helix in a virtual universe, and populate the 3-D time helix with a set of data objects. The time helix tool further comprises a rendering component configured to render the 3-D time helix with at least one of the set of data objects to a user of the virtual universe.

Figure 1:
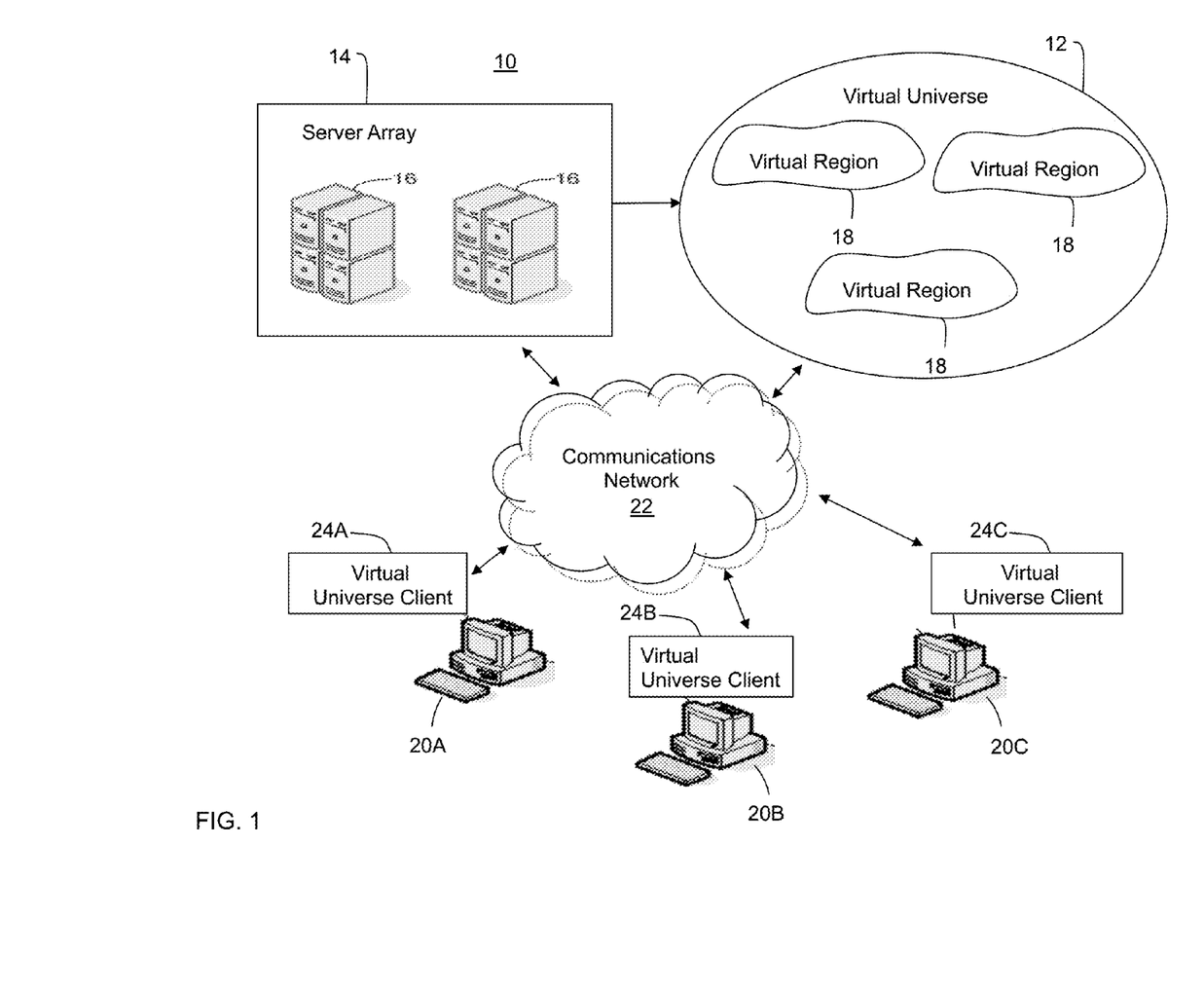
FIG. 1 shows a high-level schematic diagram showing a networking environment for providing a virtual universe according to one embodiment of this invention.

FIG. 1 shows a high-level schematic diagram showing a networking environment 10 for providing a virtual universe (VU) 12 according to one embodiment of this invention in which a service for rendering a 3-D time helix in a virtual universe can be utilized. As shown in FIG. 1, networking environment 10 comprises a server array or grid 14 comprising a plurality of servers 16 each responsible for managing a portion of virtual real estate within VU 12. A virtual universe provided by a multiplayer online game, for example, can employ thousands of servers to manage all of the virtual real estate. The virtual content of VU 12 is comprised of a number of avatars and objects, each having associated texts/scripts defined in a programming language readable by VU 12. The virtual content is managed by each of servers 16 within server array 14 and may show up in VU 12 as a virtual region 18. Like the real-world, each virtual region 18 within VU 12 comprises a landscape having virtual content, such as buildings, stores, clubs, sporting arenas, parks, beaches, cities and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with VU 12 through a communications network 22 via virtual universe clients 24A-24C (hereinafter referred generally as 24) that reside in computers 20, respectively. Below are further details of VU 12, server array 14, and virtual universe client 24.

Figure 2:
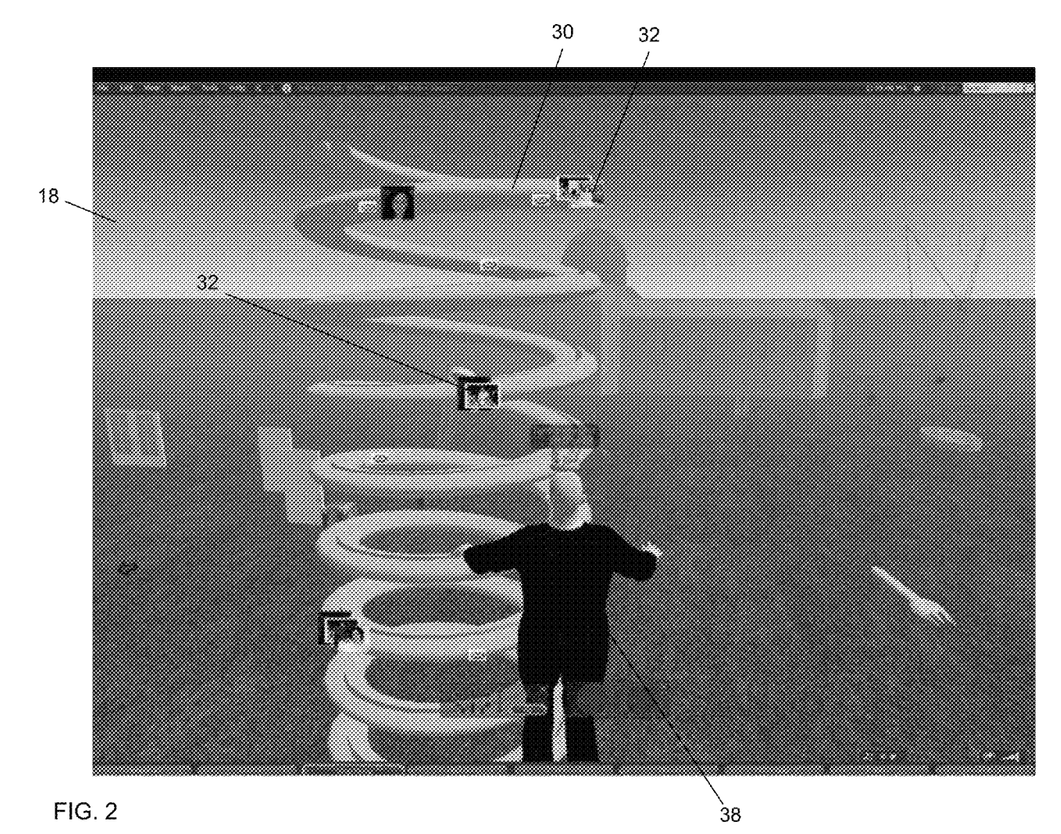
FIG. 2 shows a more detailed view of a 3-D time helix in a virtual region that operates in the environment shown in FIG. 1.

FIG. 2 shows a more detailed view of what one virtual region 18 in VU 12 may comprise. As an example, virtual region 18 shown in FIG. 2 comprises a 3-D time helix 30, which allows users of virtual region 18 to search and display a set of data objects 32, as will be further described herein. An avatar 38, which as mentioned above, is a persona or representation of a user of the virtual universe, roams all about the virtual region by walking, driving, flying or even by teleportation or transportation, which is essentially moving through space from one point to another, more or less instantaneously. It will be appreciated that virtual region 18 is not limited to the embodiment shown, and can have any number of avatars and objects that can be found in real-life as well as the virtual world.

Figure 3:
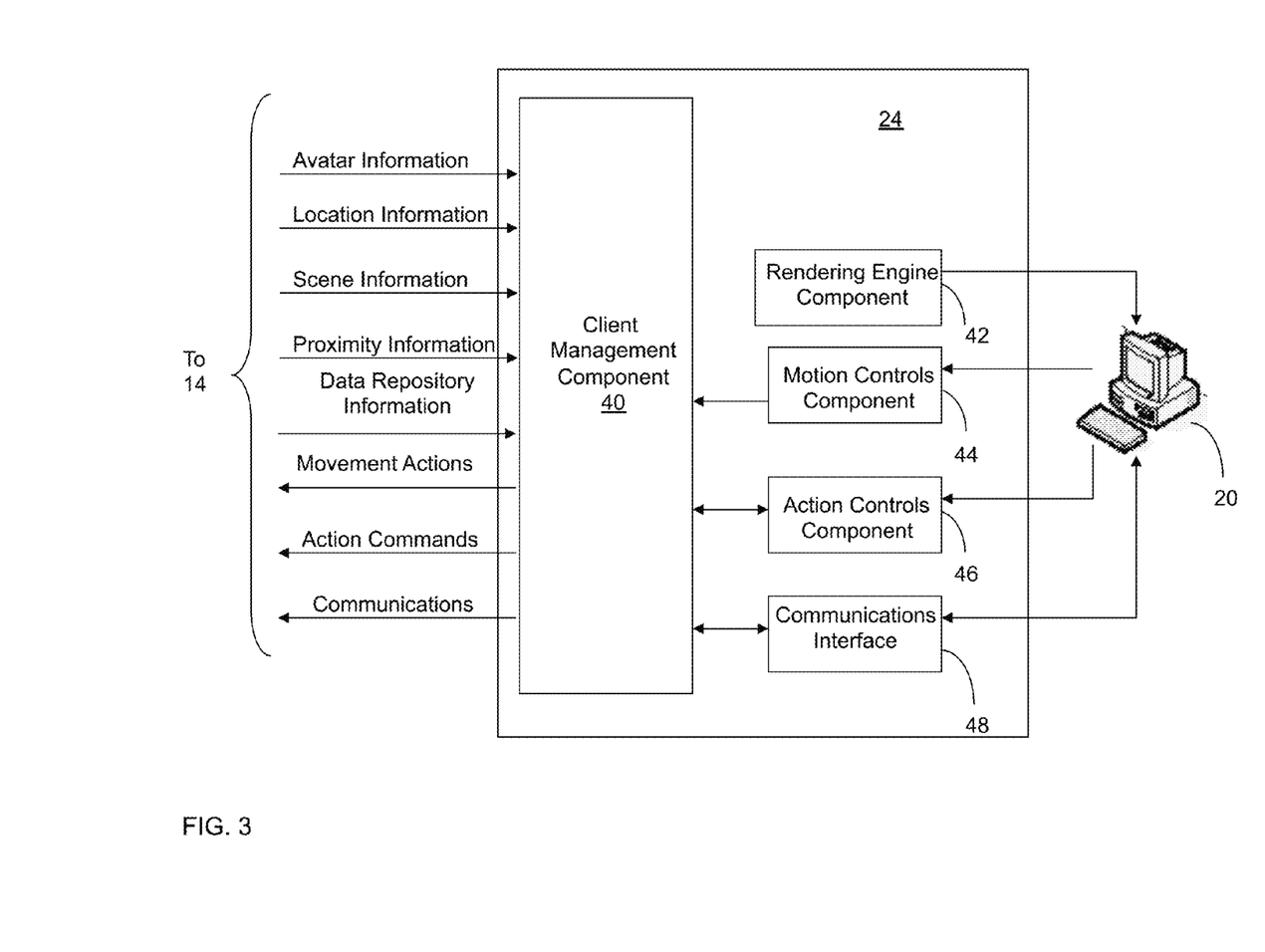
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands and communications made by a user through computer 20, and information received from the virtual universe through server array 14. A rendering engine component 42 enables the user of computer 20 to visualize the particular region of VU 12 that the avatar is presently located.

A motion controls component 44 enables the user's avatar (s) to make movements through the virtual universe. In one embodiment, movements through the virtual universe can include, for example, gestures, postures, walking, running, driving, flying, and selecting data objects displayed along 3-D time helix 30. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking and electronic mail (e-mail). Communications interface 48 may also allow users to query a data repository 62 (FIG. 4), which contains a plurality of data objects associated with the user of avatar 38.

FIG. 3 shows the various types of information received by client management component 40 from the virtual universe through the server array 14. In particular, client management component 40 receives avatar information about the avatars that are in proximity to the user's avatar, as well as information about the avatars that are in proximity (i.e., near) to objects of interest in the virtual universe. In addition, client management component 40 receives location information about the area that the user's avatar is near (e.g., what region or land the avatar is in), as well as scene information (e.g., what the avatar is viewing). Client management component 40 also receives proximity information, which contains information on what the user's avatar is near, and data repository information, which is information about the objects and metadata of the data objects located within data repository 62. FIG. 3 also shows the movement commands and action commands that are generated by the user and sent to the server array via client management component 40, as well as the communications that can be sent to the users of other avatars within the virtual universe.

Figure 4:
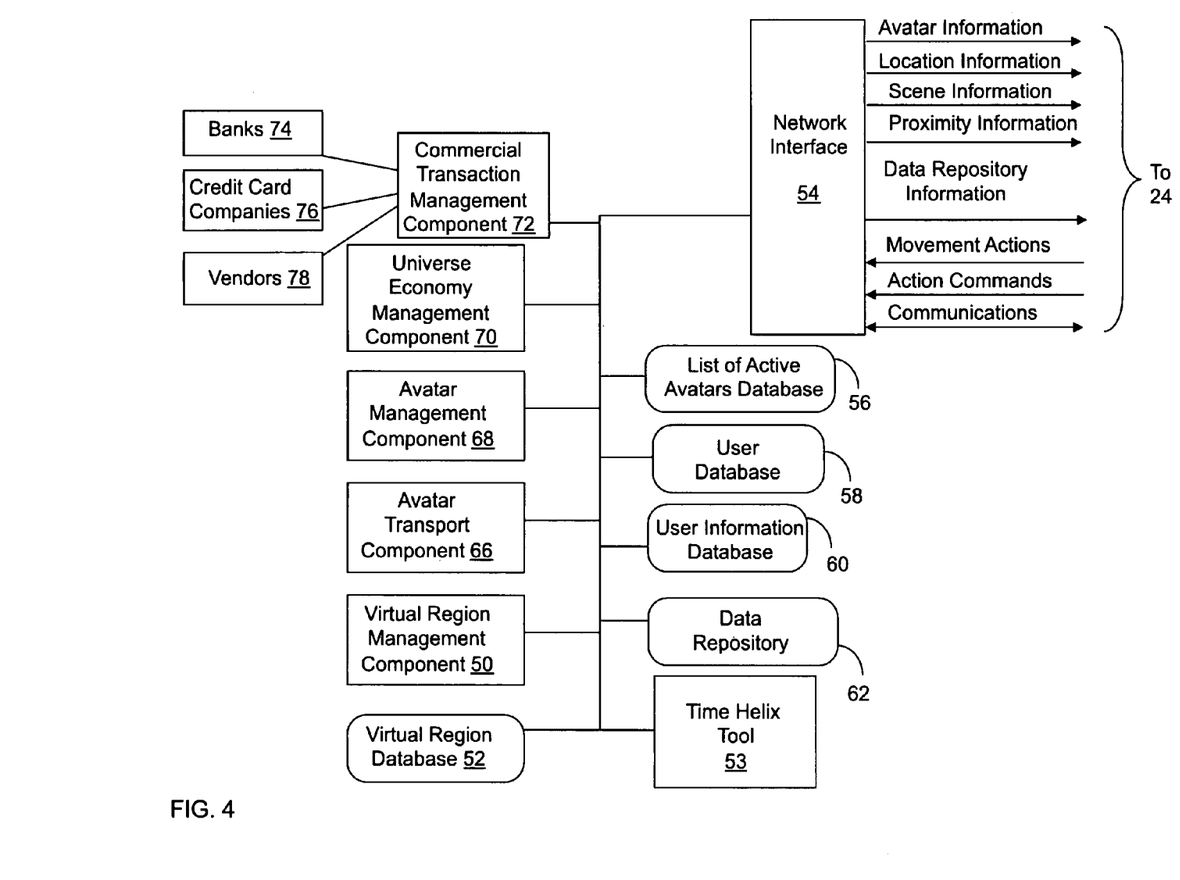
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, scene, proximity, and data repository information to the user through virtual universe client 24. The network interface receives movement and action commands, as well as communications from the user via virtual universe client 24.

FIG. 4 also shows a time helix tool 53, which allows user interaction with 3-D time helix 30 to search and render various data objects within VU 12, as will be further described below. In this embodiment, time helix tool 53 resides on the same computer system as virtual universe client 24. However, it can be appreciated that in other embodiments, time helix tool 53 may reside on the same side as servers 16, or reside on separate computers in direct communication with the virtual universe servers 16 and virtual universe clients 24.

As shown in FIG. 4, there are several different databases for storing information. In particular, virtual region database 52 stores information on all of the specifics in the virtual region that virtual region management component 50 is managing. Virtual region database 52 contains metadata information about the objects, texts and scripts associated with the virtual content in the virtual region(s) of VU 12. List of active avatars database 56 contains a list of all the avatars that are online in the VU 12, while databases 58 and 60 contain information on the actual human users of VU 12. In one embodiment, user database 58 contains general information on the users such as names, email addresses, locales, interests, ages, preferences, etc., while user information database 60 contains more sensitive information on the users such as billing information (e.g., credit card information) for taking part in transactions.

A data repository 62 contains information on the users and their avatars that reside in VU 12. In one embodiment, data repository 62 is a storage mechanism that contains information about the various data objects and corresponding metadata associated with each user's daily life. Data repository 62 is capable of storing video, sound, biometrics, external sensor data, and any other information that captures a user's experience both in the real world and VU 12. In one embodiment, data repository 62 may including information received from a Digital Life Recorder, which is described in commonly owned and co-pending U.S. patent application Ser. No. 11/968,772. The Digital Life Recorder comprises a system that captures as much information as possible about a user's daily life using various data collecting sensors, sometimes located on the user's body. An illustrative but non-limiting listing of the real world and virtual content (i.e., objects) that can be present in data repository 62 includes photos and photo albums, graphics files, sound files, animations, electronic documents, video files, avatar accessories (e.g., clothing), virtual pets, vehicles, electronic media (e.g., music files), avatar body parts, avatar tools, calling cards, note cards, or any other type of real world or virtual content. As will be discussed in further detail below, time helix tool 53 populates, organizes, and displays data objects from data repository 62 along 3-D time helix 30 for potential manipulation by avatar 38.

Those skilled in the art will recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, an avatar might want to pay for a service that generates and renders 3-D time helix 30 in VU 12. In this case, the avatar would make the purchase of this service using the $VU. In another example, a user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76 and vendors 78.

Figure 5:
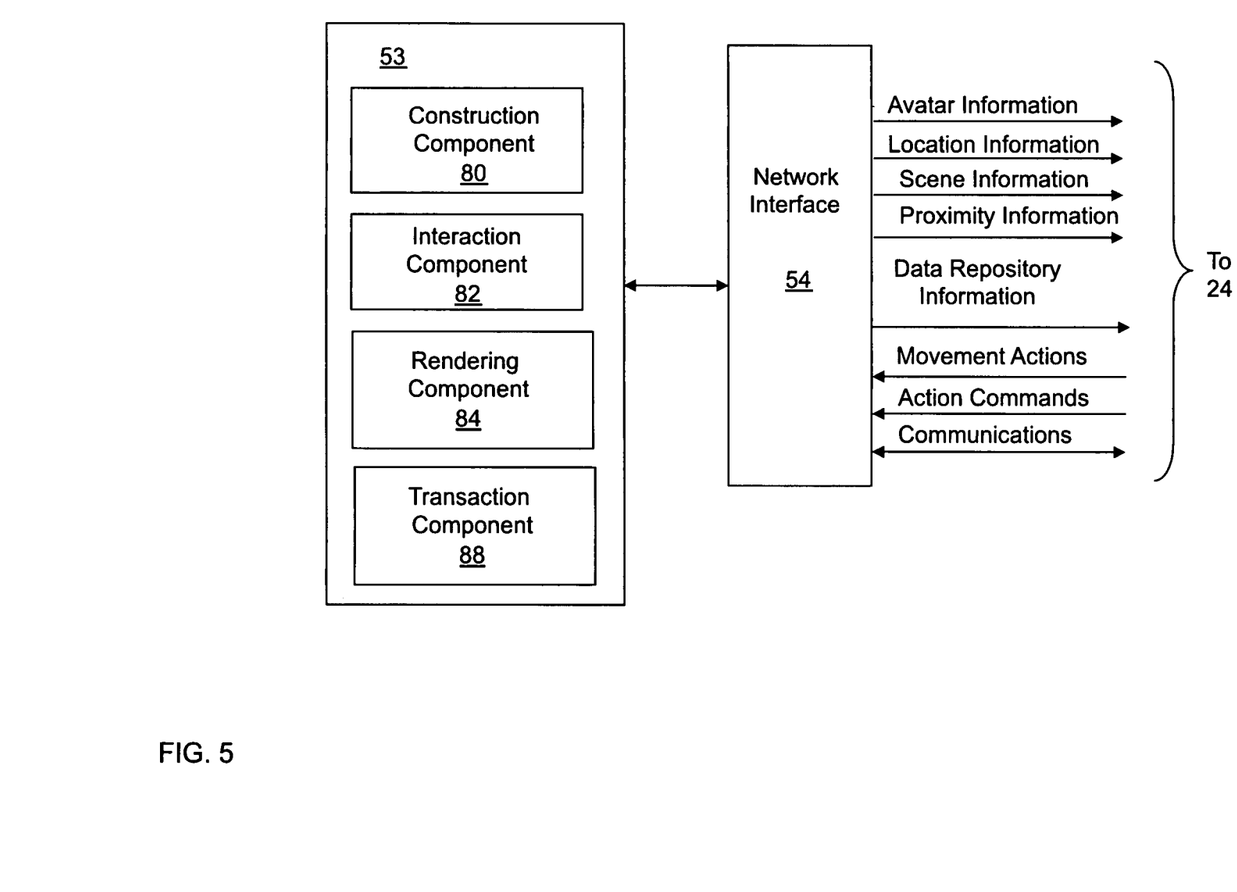
FIG. 5 shows a time helix tool according to one embodiment of this invention that operates in the environment shown in FIG. 1.

Referring now to FIGS. 2 and 5, time helix tool 53 according to embodiments of the invention will be described in further detail. As shown, time helix tool 53 comprises a creation component 80 configured to generate 3-D time helix 30 in VU 12, wherein 3-D time helix 30 allows users to organize and view various data objects according to time. In one embodiment, creation component 80 is configured to determine a date range for set of data objects 32 located within data repository 62, and generate 3-D time helix 30 according to the date range for set of data objects 32. Specifically, creation component 80 analyzes the date/time value of the earliest and the latest (i.e., most recent) objects in data repository 62, and generates a plurality of rotations (i.e., helix loops), each representing an increment of time. 3-D time helix 30 may be generated with each rotation representing one year, month, or day, etc.

Users may control the time increments using an interaction component 82, which is configured to adjust a dimension of 3-D time helix 30 to adjust the increment of time corresponding to each of the plurality of rotations of 3-D time helix 30. For example, a user may provide an input (e.g., via a mouse, touch screen, etc.) to "stretch" or "compress" 3-D time helix 30 such that each loop represents a smaller or larger increment of time, respectively. It will be appreciated that the number of data objects displayed for a given unit of time is optimized so as to reduce clutter and maximize viewability on 3-D time helix 30. Further, data objects may be organized such that a single main thumbnail or representation may be used to represent any number of hierarchical directories/folders, also containing data objects. Selecting the main thumbnail may generate one or more additional 3-D time helixes, generally corresponding to smaller increments of time.

Next, any number of data objects from data repository 62 may be arranged along 3-D time helix 30. To accomplish this, construction component 80 is configured to populate 3-D time helix 30 with set of data objects 32. Specifically, construction component 80 generates a representation (e.g., a thumbnail, or a miniaturized version of an object, etc.) of at least one of set of data objects 32 located within data repository 62 along 3-D time helix 30 according to the date range of set of data objects 32. Rendering component 84 renders 3-D time helix 30 with the at least one of set of data objects 32 to a user of VU 12, while interaction component 82 allows interaction (e.g., organization, manipulation, display, etc.) with set of data objects 32 and 3-D time helix 30 via avatar 38. In one embodiment, a virtual world pop-up window (not shown) may allow the user to enter textual searches to refine the objects, as well as how they're organized along 3-D time helix 30. Interaction component 82 is configured to allow interaction with set of data objects 32 and 3-D time helix 30 via avatar 38. In one embodiment, avatar 38 may select a plurality of objects from set of data objects 32 displayed along 3-D time helix and add the objects to a folder/album. In this example, avatar 38 may "fly" along 3-D time helix 30 and select the data object(s) that are to be added to the folder/album.

In another embodiment of this invention, time helix tool 53 is used as a service to charge fees for providing a 3-D time helix populated with a plurality of data objects associated with a user of the virtual universe. As shown in FIG. 5, time helix tool 53 comprises a transaction component 88 configured to charge a transaction fee for facilitating the rendering of the 3-D time helix in VU 12. In this embodiment, the provider of the virtual universe or a third party service provider could offer this transaction as a service by performing the functionalities described herein on a subscription and/or fee basis. In this case, the provider of the virtual universe or the third party service provider can create, deploy, maintain, support, etc., time helix tool 53 that performs the processes described herein. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to provide the 3-D time helix in the virtual universe. In this case, time helix tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
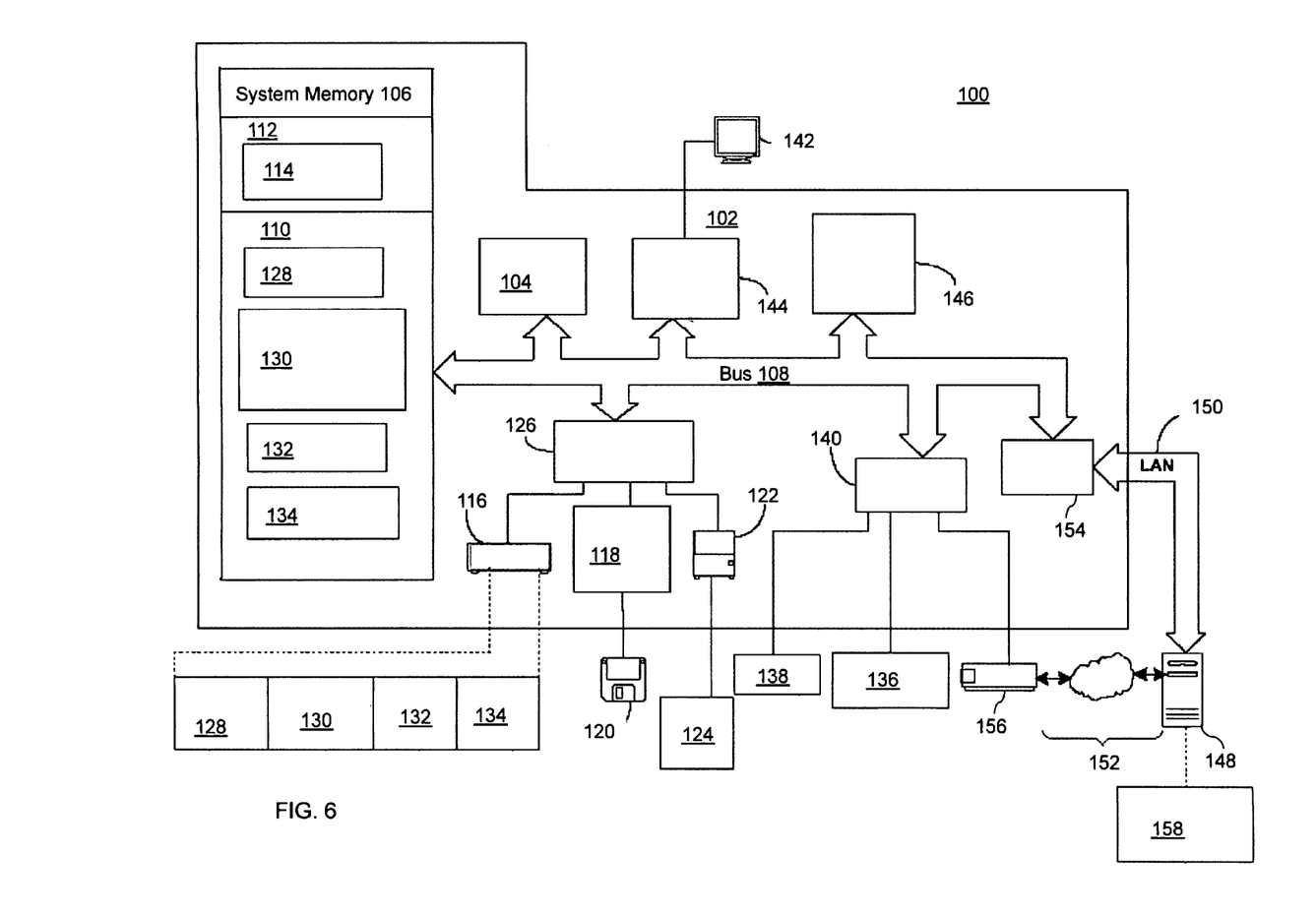
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of time helix tool 53, such as construction component 80, interaction component 82, rendering component 84, and transaction component 88.

Figure 7:
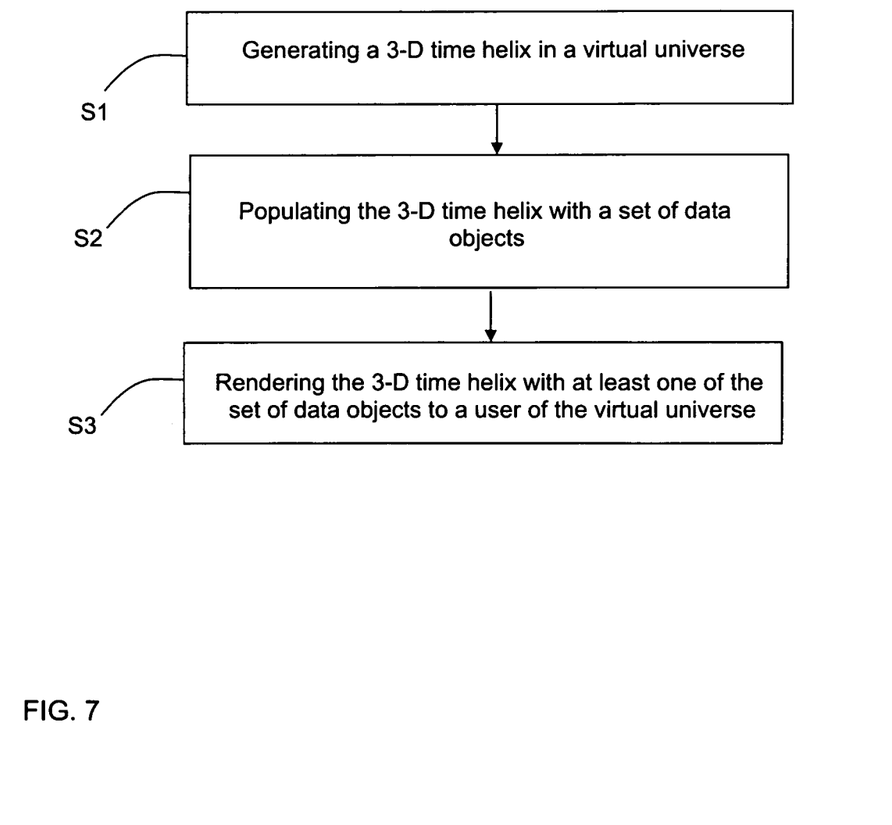
FIG. 7 shows a flow diagram of a method for rendering a 3-D time helix in a virtual universe according to embodiments of the invention.

The one or more program modules 130 carry out the methodologies disclosed herein, as shown in FIG. 7. According to one embodiment, in step S1, a 3-D time helix is generated in a virtual universe. In S2, the 3-D time helix is populated with a set of data objects. In S3, the 3-D time helix is rendered with at least one of the set of data objects to a user of the virtual universe. The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on some form of computer readable media. Computer readable media can be any available media that can be accessed by a computer. By way of example, and not limitation, computer readable media may comprise "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is apparent that there has been provided with this invention an approach for rendering the 3-D time helix in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for rendering a three dimensional (3-D) time helix in a virtual universe, the method comprising:
   capturing information associated with events of a user of the virtual universe through a set of data collecting sensors located on a set of personal devices of the user, and storing the captured information in a database as metadata information about objects, texts, and scripts associated with virtual content in the virtual universe;
   analyzing a time value of an earliest and a latest entry in the database;
   generating, based on the analysis, a 3-D time helix in the virtual universe from the metadata information stored in the database;
   populating the 3-D time helix with a set of data objects, the set of data objects comprising images associated with the captured information, and the 3-D time helix comprising indicators of connections between each of the set of data objects and a plurality of rotations each defining an equal time increment of a date range corresponding to the set of data objects, wherein adjusting a compression of the 3-D time helix adjusts the time increment defined by each of the plurality of rotations;
   optimizing the time increment of the plurality of rotations to minimize visual confusion and maximize a view of the set of data objects stored in the database and presented on the 3-D time helix;
   rendering the 3-D time helix with at least one of the set of data objects to the user;
   modifying a scope of the 3-D time helix in response to an interaction with the 3-D time helix by an avatar of the user, the interaction comprising a proximity of the avatar in 3-D space to a portion of the 3-D time helix; and
   rendering an object in the virtual universe corresponding with a data object selected by the user from the 3-D time helix.

2. The method according to claim 1, the generating comprising: determining a date range for the set of data objects, the set of data objects located within a data repository.

3. The method according to claim 2, the populating comprising generating a representation of at least one of the set of data objects along the 3-D time helix according to the date range of the set of data objects.

4. The method according to claim 1 further comprising adjusting a pitch of the 3-D time helix to adjust the increment of time corresponding to each of the plurality of rotations of the 3-D time helix.

5. The method according to claim 1 further comprising interacting with the set of data objects and the 3-D time helix via an avatar.

6. The method according to claim 1 further comprising charging a rendering fee for facilitating the rendering of the 3-D time helix with at least one of the set of data objects to the user in the virtual universe.

7. The method according to claim 1 further comprising:
receiving an interaction by an avatar of the user with a data object of the set of data objects;
generating a second 3-D time helix corresponding to a sub-increment of the date range of the set of data objects; and
populating the second 3-D time helix with a sub-set of data objects.

8. A computer system for rendering a three-dimensional (3-D) time helix in a virtual universe, comprising:
a processor;
memory, comprising program instructions, operably associated with the processor; and
program instructions of a time helix tool storable in the memory and executable by the processor, the program instructions of the time helix tool causing the system to:
capture information associated with events of a user of the virtual universe through a set of data collecting sensors located on a set of personal devices of the user, and store the captured information in a database as metadata information about objects, texts, and scripts associated with virtual content in the virtual universe;
analyze a time value of an earliest and a latest entry in the database;
generate, based on the analysis, a 3-D time helix in the virtual universe from the metadata information stored in the database;
populate the 3-D time helix with a set of data objects, the set of data objects comprising images associated with the captured information, and the 3-D time helix comprising indicators of connections between each of the set of data objects and a plurality of rotations each defining an equal time increment of a date range corresponding to the set of data objects, wherein adjusting a compression of the 3-D time helix adjusts the time increment defined by each of the plurality of rotations;
optimize the time increment of the plurality of rotations to minimize visual confusion and maximize a view of the set of data objects stored in the database and presented on the 3-D time helix;
render the 3-D time helix with at least one of the set of data objects to the user;
modify a scope of the 3-D time helix in response to an interaction with the 3-D time helix by an avatar of the user, the interaction comprising a proximity of the avatar in 3-D space to a portion of the 3-D time helix; and
render an object in the virtual universe corresponding with a data object selected by the user from the 3-D time helix.

9. The time helix tool according to claim 8, the program instructions of the time helix tool further causing the system to: determine a date range for the set of data objects, the set of data objects located within a data.

10. The computer system according to claim 9, the program instructions of the time helix tool further causing the system to generate a representation of at least one of the set of data objects along the 3-D time helix according to the date range of the set of data objects.

11. The time helix tool according to claim 8, the program instructions of the time helix tool further causing the system to adjust a pitch of the 3-D time helix to adjust the increment of time corresponding to each of the plurality of rotations of the 3-D time helix.

12. The time helix tool according to claim 11, the program instructions of the time helix tool further causing the system to allow interaction with the set of data objects and the 3-D time helix via an avatar.

13. The time helix tool according to claim 11, the program instructions of the time helix tool further causing the system to:
receive an interaction by an avatar of the user with a data object of the set of data objects;
generate a second 3-D time helix corresponding to a sub-increment of the date range of the set of data objects; and
populate the second 3-D time helix with a sub-set of data objects.

14. The time helix tool according to claim 8, the program instructions of the time helix tool further causing the system to charge a rendering fee for facilitating the rendering of the 3-D time helix with at least one of the set of data objects to the user in the virtual universe.

15. A computer-readable hardware storage device, wherein the computer-readable hardware storage device is not a transitory signal, storing computer instructions, which when executed, enables a computer system to render a three-dimensional (3-D) time helix in a virtual universe, the computer instructions comprising:
capturing information associated with events of a user of the virtual universe through a set of data collecting sensors located on a set of personal devices of the user, and storing the captured information in a database as metadata information about objects, texts, and scripts associated with virtual content in the virtual universe;
analyzing a time value of an earliest and a latest entry in the database;
generating, based on the analysis, a 3-D time helix in the virtual universe from the metadata information stored in the database;
populating the 3-D time helix with a set of data objects, the set of data objects comprising images associated with the captured information, and the 3-D time helix comprising indicators of connections between each of the set of data objects and a plurality of rotations each defining an equal time increment of a date range corresponding to the set of data objects, wherein adjusting a compression of the 3-D time helix adjusts the time increment defined by each of the plurality of rotations;
optimizing the time increment of the plurality of rotations to minimize visual confusion and maximize a view of the set of data objects stored in the database and presented on the 3-D time helix;
rendering the 3-D time helix with at least one of the set of data objects to the user;
modifying a scope of the 3-D time helix in response to an interaction with the 3-D time helix by an avatar of the user, the interaction comprising a proximity of the avatar in a 3-D space to a portion of the 3-D time helix; and
rendering an object in the virtual universe corresponding with a data object selected by the user from the 3-D time helix.

16. The computer-readable hardware storage device according to claim 15, the computer instructions for generating further comprising:

determining a date range for the set of data objects, the set of data objects located within a data repository.

17. The computer-readable hardware storage device according to claim 16, the computer instructions for populating further comprising generating a representation of at least one of the set of data objects along the 3-D time helix according to the date range of the set of data objects.

18. The computer-readable hardware storage device according to claim 16 further comprising computer instructions for adjusting a pitch of the 3-D time helix to adjust the increment of time corresponding to each of the plurality of rotations of the 3-D time helix.

19. The computer-readable hardware storage device according to claim 18 further comprising computer instructions for allowing interaction with the set of data objects and the 3-D time helix via an avatar.

20. The computer-readable hardware storage device according to claim 15 further comprising instructions for charging a rendering fee for facilitating the rendering of the 3-D time helix with at least one of the set of data objects to the user in the virtual universe.

21. The computer-readable hardware storage device according to claim 15 further comprising computer instructions for:
receiving an interaction by an avatar of the user with a data object of the set of data objects;
generating a second 3-D time helix corresponding to a sub-increment of the date range of the set of data objects; and
populating the second 3-D time helix with a sub-set of data objects.

22. A method for deploying a time helix tool for use in a computer system that provides interaction with a three-dimensional (3-D) time helix in a virtual universe, comprising:
providing a computer infrastructure operable to:
capture information associated with events of a user of the virtual universe through a set of data collecting sensors located on a set of personal devices of the user, and storing the captured information in a database as metadata information about objects, texts, and scripts associated with virtual content in the virtual universe;
analyze a time value of an earliest and a latest entry in the database;
generate, based on the analysis, a 3-D time helix in the virtual universe from the metadata information stored in the database;
populate the 3-D time helix with a set of data objects, the set of data objects comprising images associated with the captured information, and the 3-D time helix comprising indicators of connections between each of the set of data objects and a plurality of rotations each defining an equal time increment of a date range corresponding to the set of data objects, wherein adjusting a compression of the 3-D time helix adjusts the time increment defined by each of the plurality of rotations;
optimize the time increment of the plurality of rotations to minimize visual confusion and maximize a view of the set of data objects stored in the database and presented on the 3-D time helix;
render the 3-D time helix with at least one of the set of data objects to the;
modify a scope of the 3-D time helix in response to an interaction with the 3-D time helix by an avatar of the user, the interaction comprising a proximity of the avatar in 3-D space to a portion of the 3-D time helix; and
render an object in the virtual universe corresponding with a data object selected by the user from the 3-D time helix.

* * * * *